United States Patent [19]

Mathews et al.

[11] 4,452,335
[45] Jun. 5, 1984

[54] SOUND ABSORBING STRUCTURE FOR A GAS TURBINE ENGINE

[75] Inventors: Douglas C. Mathews, Marlborough; Aldo A. Peracchio, South Windsor, both of Conn.

[73] Assignee: United Technologies Corporation, Hartford, Conn.

[21] Appl. No.: 374,469

[22] Filed: May 3, 1982

[51] Int. Cl.³ .............................................. B64D 33/02
[52] U.S. Cl. ..................................... 181/214; 181/222; 415/119
[58] Field of Search ............... 181/213, 214, 222, 224, 181/286, 288, 279, 291–293; 244/1 N; 415/119; 60/270 R

[56] References Cited

U.S. PATENT DOCUMENTS

| | | | |
|---|---|---|---|
| 2,392,247 | 1/1946 | Katcher | 181/270 |
| 3,113,634 | 12/1963 | Watters | 181/224 |
| 3,166,149 | 1/1965 | Hulse et al. | 181/292 |
| 3,542,152 | 11/1970 | Adamson et al. | 181/214 |
| 3,685,611 | 8/1972 | Duvvuri | 181/213 |
| 4,231,447 | 11/1980 | Chapman | 181/293 X |
| 4,242,176 | 12/1980 | Riel | 156/630 |
| 4,254,171 | 3/1981 | Beggs et al. | 428/116 |
| 4,269,882 | 5/1981 | Carrillo et al. | 428/116 |
| 4,271,219 | 6/1981 | Brown | 428/116 |
| 4,291,079 | 9/1981 | Hom | 428/116 |
| 4,292,356 | 9/1981 | Whitemore et al. | 428/116 |
| 4,294,329 | 10/1981 | Rose et al. | 181/222 |
| 4,313,524 | 2/1982 | Rose | 181/291 |

OTHER PUBLICATIONS

Graphic Models for Acoustic Flow Resistance by F. W. Cole, American Society for Metals, Technical Note MDD 503, Apr. 1969.
Gas Turbine Auxiliary Power Unit Noise and Its Attenuation by James J. Dias, Society of Automotive Engineers, 670155, Jan. 9–13, 1967.

Primary Examiner—Benjamin R. Fuller
Attorney, Agent, or Firm—Gene D. Fleischhauer

[57] ABSTRACT

A sound absorbing structure 38, 52 for a gas turbine engine 10 is disclosed. The sound absorbing structure 52 includes a wall element 54 and a casing 34 of the engine or nacelle 12. The casing is spaced from the wall element leaving a cavity 62 therebetween which is compartmentalized by partitions 64, 66. In one embodiment the partitions are attached to either the wall element or the casing element. In another embodiment the partitions are all attached to the wall element and spaced from the casing element or are all attached to the casing element and spaced from the wall element. In another embodiment the partitions are alternately spaced from the casing element and the wall element such that every other partition 64a is spaced from the wall and the remaining partitions 64b are spaced from the casing.

10 Claims, 6 Drawing Figures

SOUND ABSORBING STRUCTURE FOR A GAS TURBINE ENGINE

TECHNICAL FIELD

This invention relates to gas turbine engines and, more particularly, to a sound absorbing structure disposed adjacent to an annular flow path for working medium gases passing through such an engine.

BACKGROUND ART

A gas turbine engine of the turbo-fan type has a fan section, a compressor section, a combustion section and a turbine section. An annular flow path for working medium gases extends axially through these sections. As the working medium gases are flowed along the flow path, the gases are pressurized in the fan and compressor sections and burned with fuel in the combustion section to add energy to the gases. The hot, high pressure gases are expanded through the turbine section to produce useful work for pressurizing the gases in the fan and compressor sections and thrust for propelling the gas turbine engine.

A rotor assembly extends axially through the engine to transfer the work of pressurization from the turbine section to the fan section. The rotor assembly in the fan section includes arrays of rotor blades angled with respect to the approaching flow. The blades are rotatable about the axis of rotation of the engine. As the blades are rotated about the axis of rotation, the blades do work on the gases to increase the pressure of the gases. The passage of these gases through the engine and the passage of the blades through the gases is accompanied by the generation of acoustic energy or noise. Noise is a source of concern to the manufacturers of aircraft and aircraft engines. The manufacturers are especially concerned with the adverse effect of excessive levels of noise on passengers, aircraft personnel and residents in close proximity to airports.

Pratt & Whitney Aircraft, a division of United Technologies Corporation, introduced in the late 1960's a sound attenuation structure employing a liner made of permeable metal to reduce the noise of its JT9D model engines. The liners are installed in the engine ducts of the engine and are each spaced from the casing bounding the duct to form a sound absorbing cavity between the casing and the liner. The liner for the early JT9D models is formed of a porous, acoustically resistive wire mesh welded to the surface of a perforate plate. The perforate plate is adjacent to the working medium flow path. The wire mesh is disposed between the perforate plate and the casing.

One particular example of a wire mesh suitable for use in sound attenuation liners is Rigimesh ® woven wire mesh available from the Paul Corporation of New York. Rigimesh ® woven wire mesh is made rigid by furnace bonding the wires at all contact points as shown, for example, in U.S. Pat. No. 2,925,650 entitled METHOD OF FORMING PERFORATE METAL SHEETS (illustrating sintering) and U.S. Pat. No. 3,049,796 entitled PERFORATE METAL SHEETS (illustrating diffusion bonding). Other recommended wire mesh constructions are discussed in an article entitled "Graphic Models For Acoustic Flow Resistance" by F. W. Cole available from the American Society for Metals (Technical Note MDD 503, 1969). The wire mesh constructions mentioned in the article include a liner formed of two layers of metal mesh and a liner formed of a single layer of fiber web backed with a layer of coarse mesh.

In the late 1960's other acoustically resistive materials were available as substitutes for the wire mesh of the wire mesh-perforate plate combination. One substitute material was a fiber metal sheet—a porous, acoustically resistive material which performs a function similar for sound attenuation purposes to the function performed by the wire mesh. Fiber metal sheets are formed of randomly interlocked metal fibers in the form of a sintered and pressed sheet or a sintered and rolled sheet. Other porous, acoustically resistive materials known to have utility in gas turbines are listed and illustrated in an article entitled "Gas Turbine Auxiliary Power Unit Noise and Its Attenuation" by James J. Dias available from the Society of Automotive Engineers (Paper No. 670155, 1967). These materials include a slitted metal material formed of a stainless steel sheet having about 3,000 slits per square foot and a porous urethane foam having a known density and flow resistance.

Another approach to sound attenuation in jet engines is to form a separate, acoustically self contained, panel for sound attenuation. The panel is installed as a self-contained module in the engine adjacent to the working medium flow path. Such panels are analogous to the panels shown in U.S. Pat. No. 3,113,634 issued to Watters entitled SOUND ABSORBING PANELS FOR LINING A DUCT. These panels were developed in the early 1960's for use in ducts and in test cells for aircraft jet engines. The panels employ a porous, acoustically resistive sheet bonded to a perforate plate. The assembly of the porous sheet and perforate plate is bonded to one face of a honeycomb core. An impervious sheet is attached to the other face of the honeycomb core to provide a backing sheet to the panel.

One example of the module approach to sound attenuation developed in the late 1960's for gas turbine engines is a panel formed of a porous, acoustically resistive Rigimesh ® wire mesh attached to one face of a honeycomb core. An impervious sheet is attached to the other face of the honeycomb core to provide a backing sheet to the panel. Another example of a panel separately fabricated in the early 1970's for installation in an aircraft is shown in U.S. Pat. No. 4,254,171 issued to Beggs et al. entitled METHOD OF MANUFACTURE OF HONEYCOMB NOISE ATTENUATION STRUCTURE AND THE RESULTING STRUCTURE PRODUCED THEREBY. In this patent, as in Watters, a porous, acoustically resistive sheet is bonded to a perforate plate. The assembly of the porous sheet and perforate plate is bonded to one face of a honeycomb core. An impervious sheet is attached to the other face of the honeycomb core to act as a backing sheet. In Beggs, the acoustically resistive sheet is formed of a wire mesh. The following patents are similar to the construction shown in Beggs and show sound absorbing panels having a module which includes an acoustically resistive porous sheet, a perforate plate, a honeycomb core and an impervious backing sheet:

1. U.S. Pat. No. 3,166,149 entitled DAMPED RESONATOR ACOUSTICAL PANELS issued to Bruce T. Hulse, et al.
2. U.S. Pat. No. 4,269,882 entitled METHOD OF MANUFACTURING OF HONEYCOMB NOISE ATTENUATION AND THE STRUCTURE RESULTING THEREFROM issued to Robert M. Carillo, et al.

3. U.S. Pat. No. 4,272,219 entitled METHOD OF MANUFACTURING AN ADHESIVE BONDED ACOUSTICAL ATTENUATION STRUCTURE AND THE RESULTING STRUCTURE issued to William D. Brown.
4. U.S. Pat. No. 4,291,079 entitled METHOD OF MANUFACTURING A HONEYCOMB NOISE ATTENUATION STRUCTURE AND THE STRUCTURE RESULTING THEREFROM issued to Felix Hom.
5. U.S. Pat. No. 4,292,356 entitled METHOD OF MANUFACTURING OF HONEYCOMB NOISE ATTENUATION STRUCTURE AND THE STRUCTURE RESULTING FROM THE METHOD issued to Christopher E. Whitemore, et al.
6. U.S. Pat. No. 4,294,329 entitled DOUBLE LAYER ATTENUATION PANEL WITH TWO LAYERS OF LINEAR TYPE MATERIAL issued to Philip M. Rose, et al.

Another example of the module approach to sound attenuation using a panel separately fabricated for installation in a jet engine is shown in U.S. Pat. No. 4,313,524 issued to Rose entitled BULK ACOUSTIC ABSORBER PANELS FOR USE IN HIGH SPEED GAS FLOW ENVIRONMENTS. The sound absorbing panel replaces the honeycomb core of the above listed patents with an acoustic absorbing medium. The sound absorbing panel includes a porous acoustically resistive sheet, a perforate sheet, an impervious backing member in the shape of a pan attached to the perforate sheet and an acoustic absorbing medium such as fiberglass, open celled foam, felt or Kevlar ® disposed in the cavity between the perforate sheet and the impervious backing member.

The above art notwithstanding, scientists and engineers and still seeking to develop a durable structure for providing sound attenuation in gas turbine engines which is more effective than liners but lighter and less expensive to fabricate than panels.

DISCLOSURE OF INVENTION

According to the present invention, a sound absorbing structure for a gas turbine engine includes a casing of the engine, a permeable wall spaced radially from the casing and partitions extending between the wall and the casing to form a partitioned backing cavity in fluid communication through the wall with the working medium flow path.

In accordance with one embodiment, the partitions are either attached to the casing and spaced from the wall or attached to the wall and spaced from the casing.

A primary feature of the present invention is a sound attenuation structure which includes the impermeable casing of a gas turbine engine or nacelle. A permeable wall is spaced radially from the casing leaving a cavity therebetween. The radial distance is selected to optimize sound absorption. Partitions extend between the casing and the wall. In one embodiment, the partitions extend in either an axial or a circumferential direction. In another embodiment, the partitions are oriented in both the axial and circumferential directions. In other embodiments, the partitions either are attached to the permeable wall and spaced radially from the impermeable casing or are attached to the impermeable casing and spaced radially from the permeable wall. In one embodiment, the partitions are alternately spaced from the casing and the wall such that every other partition is spaced from the wall and the remaining partitions are spaced from the casing.

A primary advantage of the present invention is the attenuation of noise which results from avoiding variations in the acoustic resistivity of the permeable wall of a sound attenuation structure by blocking with partitions the flow of the working medium gases in the cavity between the permeable wall and a casing. The partitioned structure also avoids the creation of a sound field behind the permeable wall by interrupting the continuity of the cavity between the wall and the casing. Still another advantage is the engine efficiency which results from blocking the flow of working medium gases in the axial and circumferential directions through the cavity from regions of higher pressure in the working medium flow path to regions of lower pressure. Another advantage is the fatigue life of the sound attenuation structure which results from using the casing of the engine as the impervious backing member of the sound absorbing structure. In one embodiment, the fatigue life of the sound attenuation structure is enhanced by avoiding the transmission of vibrations from the casing element to the wall element by attaching each partition to only one of the elements.

The foregoing features and advantages of the present invention will become more apparent in the light of the following detailed description of the best mode for carrying out the invention and in the accompanying drawings.

BEST MODE FOR CARRYING OUT THE INVENTION

Figure 1:
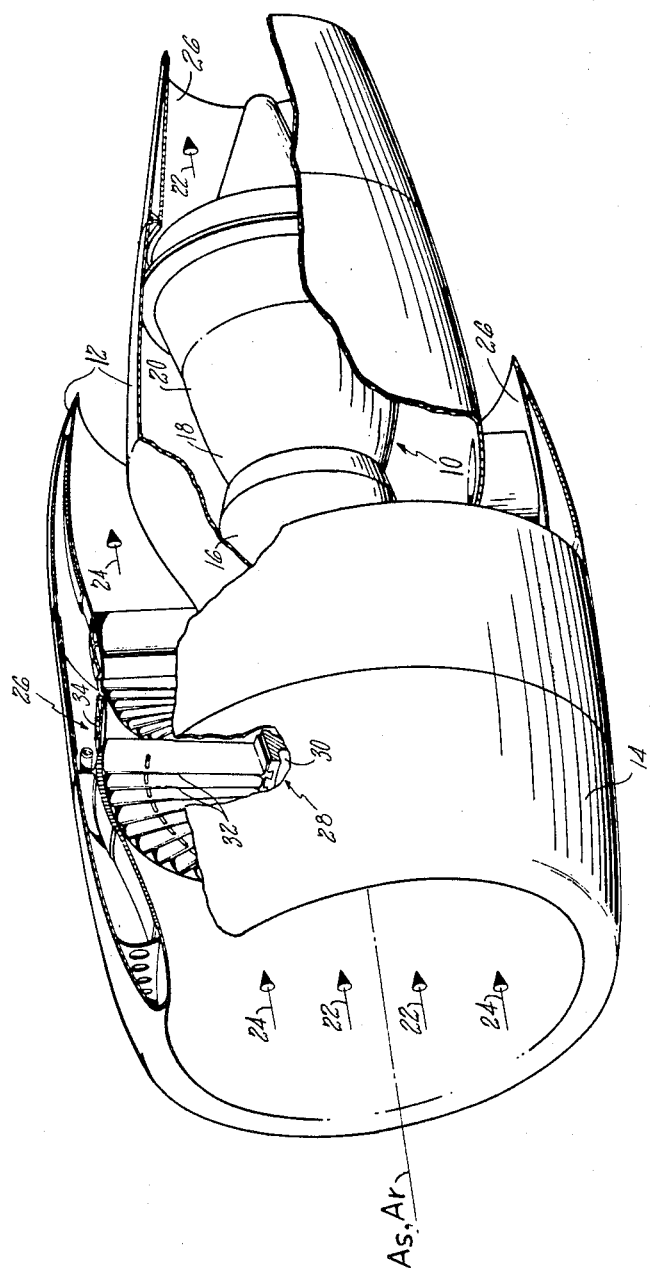
FIG. 1 is a partial perspective view of an axial flow gas turbine engine mounted in an aircraft nacelle with a portion of the nacelle and the engine broken away to show an array of rotor blades and an adjacent outer casing structure of the engine.

A gas turbine engine 10 of the axial flow, turbofan type is shown in FIG. 1. A nacelle 12 circumscribes the engine and is adapted to both support and position the engine from a support structure such as an aircraft wing (not shown). The engine is formed of fan section 14, a compressor section 16, a combustion section 18 and a turbine section 20. A primary flow path 22 for working medium gases extends rearwardly through these sections. A secondary flow path 24 for working medium gases is outwardly of the primary flow path.

The engine 10 and nacelle 12 include a stator structure 26 extending circumferentially about an axis of symmetry $A_s$. A rotor assembly 28 has an axis of rotation $A_r$. The rotor assembly includes a rotor disk 30 and a plurality of rotor blades 32. Each rotor blade extends outwardly from the disk across the working medium flow paths 22, 24 into proximity with the stator assembly.

Figure 2:
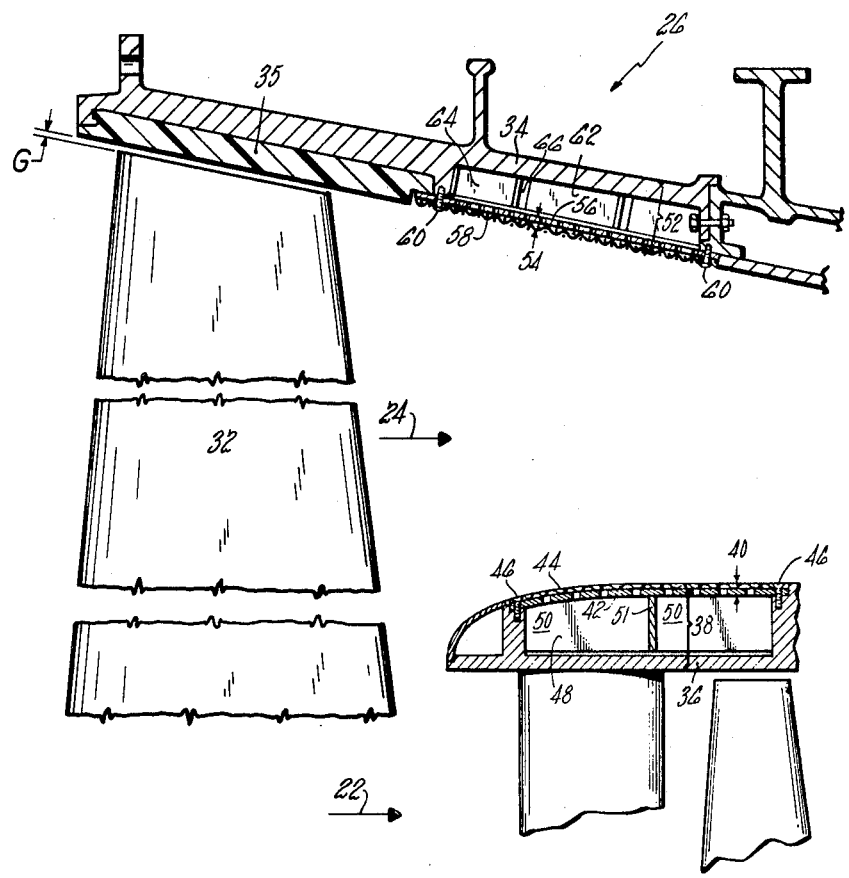
FIG. 2 is a cross-sectional view of a portion of an inner casing and the outer casing adjacent the rotor blade and is a side elevation of the rotor blade with portions of the rotor blade broken away.

FIG. 2 is an enlarged cross-sectional view of the stator structure 26 and a side elevation view of one of the rotor blades 32 with portions of the rotor blade broken away. An outer casing element such as the fan case 34 includes an abradable rubstrip 35. The rubstrip is spaced radially from the rotor blades leaving a gap G therebetween. An inner casing element, such as the inner casing 36, is spaced rearwardly from the fan blade and divides the working medium flow path into the primary flow path 22 and the secondary flow path 24.

The inner casing 36 and other elements of the engine form a first sound attenuation structure 38. The sound attenuation structure includes a wall element such as the permeable wall 40. The permeable wall is formed of a perforate plate 42 overlaid with a porous material 44 such as a porous fiber metal sheet. One satisfactory fiber metal sheet is thought to be Felt Metal ® fiber metal available from the Technetic Division of the Brunswick Corporation, Deland, Fla. The fiber metal sheet may be attached to the perforate plate mechanically or by welding, brazing, diffusion bonding, or bonding with an epoxy resin or other suitable adhesive. As used herein, the word "attached" is intended to include any method or means of fixing one object with respect to another including integrally forming the objects together. The permeable wall is mechanically attached by screws 46 or bolts to the inner casing. Other methods of attachment might be employed such as welding, brazing or bonding.

The permeable wall 40 is spaced radially from the inner casing 36 leaving a cavity 48 therebetween. The cavity is bounded by the inner casing and the permeable inner wall. The cavity is in fluid communication with the working medium flow path through the permeable wall. A plurality of partitions 50 extend in a generally axial direction and a plurality of partitions 51 extend in a generally circumferential direction to compartmentalize the cavity.

The casing element (fan case 34) outwardly of the working medium flow path and other elements of the engine form a second sound attenuation structure 52. Moreover, in addition to the casing elements 34, 36 other sound attenuation structures might be formed with other casing elements that bound the working medium flow paths 22, 24 that are a portion of the nacelle 12. The second sound attenuation structure includes a wall element such as the permeable wall 54. The permeable wall is formed of perforate plate 56 overlaid with a porous, acoustically resistive material 58 such as a fine wire mesh sheet. As with the fiber metal construction used to form the permeable wall 40, the wire mesh sheet is attached by mechanical means to the perforate plate or by welding, brazing, diffusion bonding, or bonding with an epoxy resin or other suitable adhesive. The permeable wall is mechanically attached by screws 60 or bolts to the fan case 34. Other methods of attachment might be employed such as welding, brazing or bonding.

The permeable wall 54 is spaced radially from the fan case 34 leaving a cavity 62 therebetween. The cavity is in fluid communication with the working medium flow path through the permeable wall. A plurality of first partitions 64 and a plurality of second partitions 66 extend across the cavity 48 to interrupt the axial and circumferential continuity of the cavity.

Figure 3:
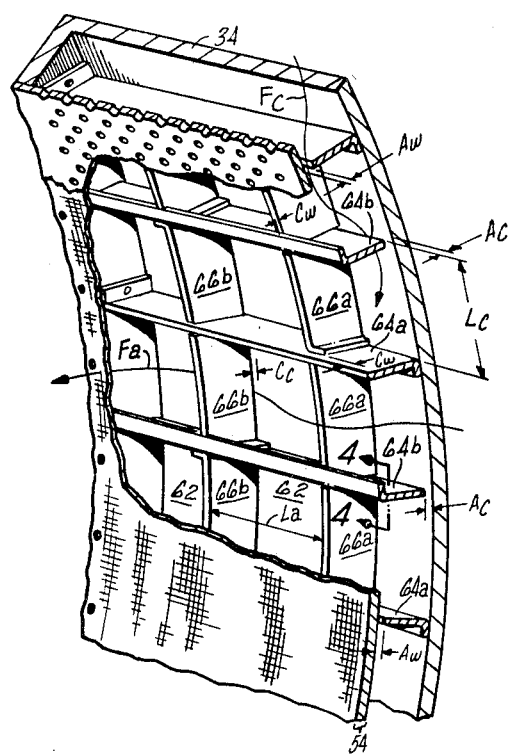
FIG. 3 is a partial perspective view of a portion of the outer casing downstream of the rotor blade.

FIG. 3 is a partial perspective view of a portion of the fan case 34 and the permeable wall 54. The following description is also applicable to the first sound attenuation structure 38 and thus describes the relationship between the partitions 50, 51 the casing 36 and the wall 40. The plurality of first partitions 64 between the fan case and the wall 54 extend in a generally axial direction. Each first partition is spaced circumferentially from the adjacent first partition by a distance $L_c$. The plurality of first partitions are alternately spaced from the fan case leaving a radial gap $A_c$ therebetween and from the wall leaving a radial gap $A_w$ therebetween. Thus, every other partition 64a is spaced a radial distance $A_w$ from the wall and is attached directly to the fan case by bonding, mechanical means or the like. The remaining first partitions 64b are each spaced a radial distance $A_c$ from the fan case and are each attached directly to the wall by bonding, mechanical means or the like.

The plurality of second partitions 66 extend in a generally circumferential direction. Each second partition is spaced axially from the adjacent second partition by a distance $L_a$. The plurality of second partitions are alternately spaced from the fan case 34 leaving a radial gap $C_c$ therebetween and from the permeable wall leaving a radial gap $C_w$ therebetween. Thus, every other partition 66a is spaced a radial distance $C_w$ from the wall and is attached directly to the fan case by bonding or mechanical means. In the embodiment shown, the partitions 66a are also attached by bonding or mechanical means to an associated partition 64a. The remaining second partitions 66b are each spaced a radial distance $C_c$ from the fan case. Each partition 66b is directly attached to the outer wall by bonding. The partitions may be attached to the outer wall by mechanical means. In the embodiment shown, each partition 66b is also attached by bonding or mechanical means to an associated partition 64b. As will be realized, the plurality of first partitions and the plurality of second partitions may all be attached to or integrally formed with the wall and spaced from the fan case. Alternatively, the partitions may all be attached or integrally formed with the fan case and spaced from the wall.

Figure 4:
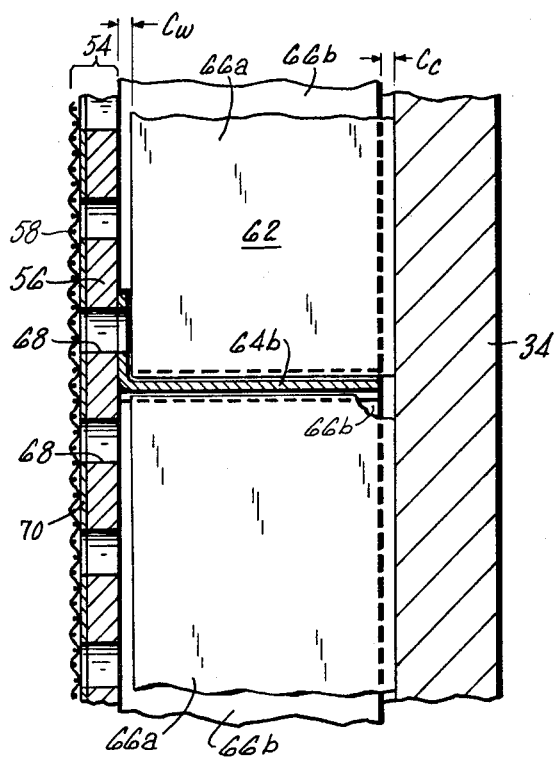
FIG. 4 is a side elevation view of the casing shown in FIG. 3 taken along the lines 4—4 of FIG. 3.

FIG. 4 is a side elevation view taken along the lines 4—4 in FIG. 3 showing the fan case 34, the permeable wall 54 and the partitions 64, 66. The axially extending partition 64b is bonded to the permeable wall. Circumferentially extending partitions 66a and 66b are shown on either side of the axially extending partition. Holes 68 in the perforate plate 56 extend through the partition 64b to ensure that all holes are in fluid communication with the circumferentially extending cavity 62. As shown in FIG. 4, the wire mesh 58 is bonded to the perforate plate with a low solvent solute epoxy adhesive 70. As will be realized, the wire mesh might also be diffusion bonded, brazed or welded to the perforate plate.

Figure 5:
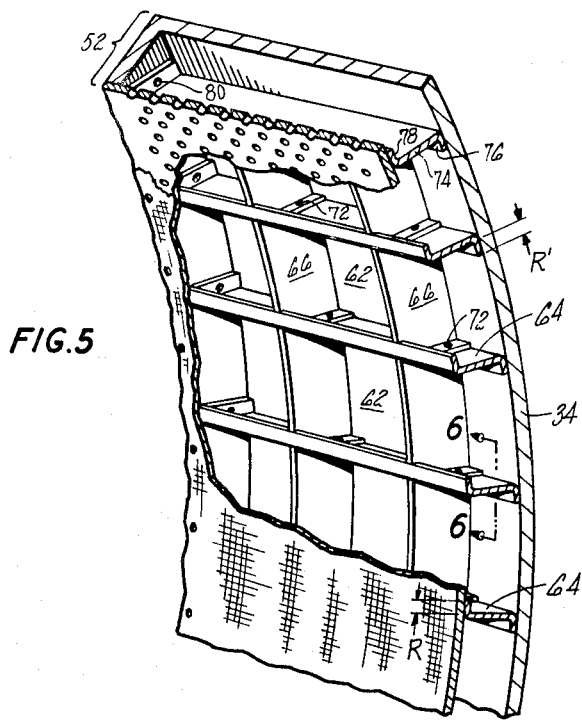
FIG. 5 is a partial perspective view of an alternate embodiment corresponding to the perspective view shown in FIG. 3.

FIG. 5 is a partial perspective view corresponding to the partial perspective view of FIG. 3 and shows an alternate embodiment. In this embodiment the partitions 64 and 66 are integrally joined to each other by bonding or by mechanical means such as a nut and bolt combination 72. The partitions are trapped between the permeable wall element 54 and the fan case 34 by the wall and the case. Each of the axially extending partitions 64 has a zee-shaped cross section. The zee-shaped cross-section is formed of a center section 74, a first end section 76 which abuts the casing element 34 and a second end section 78 which abuts the wall element 54. The center section extends in an essentially radial direction. The first end section and the second end section extend in a direction which is essentially perpendicular to the center section. The end sections adapt the partition to engage the wall element and the case element. In addition, each axially extending first partition 64 is attached to the fan case by a mechanical means such as a screw 80.

Figure 6:
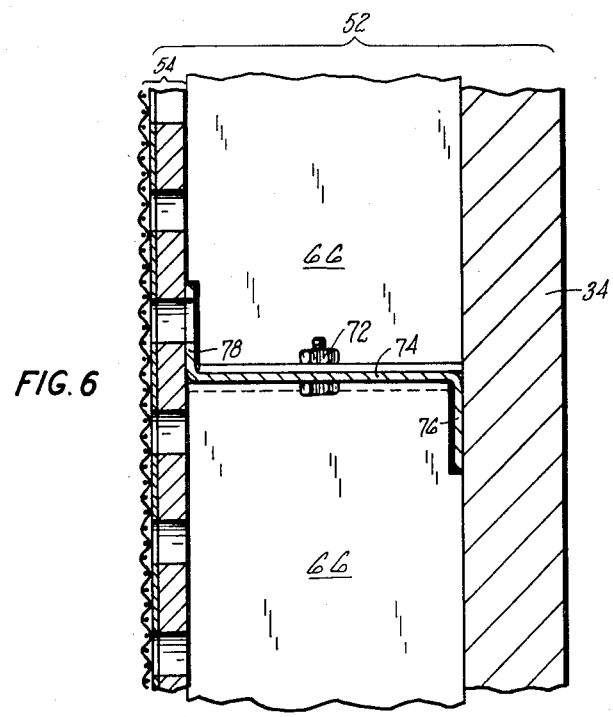
FIG. 6 is a side elevation view taken along the lines 6—6 of FIG. 5.

FIG. 6 is a view of an alternate embodiment corresponding to a view taken along the lines 6—6 of FIG. 5. In this embodiment, each of the zee-shaped partitions is attached to the fan case 34 and to the permeable wall element 54 by bonding.

During operation of the gas turbine engine, the working medium gases are compressed in the fan section 14 and the compressor section 16. The gases are burned with fuel in the combustion section 18 to add energy to the gases. The hot, high pressure gases are expanded through the turbine section 20 to produce useful work and thrust. The expanding gases drive rotor assemblies in the engine, such as the rotor assembly 28 in the fan section about the axis of rotation $A_r$. As the rotor assembly is rotated at high speed, the rotor blades travel at high velocities about the axis of rotation to compress the working medium gases in the primary flow path 22 and the secondary flow path 24. The gases flowing along the working medium flow path at high velocities and the rotor blades passing through the gases at high velocities generate acoustic energy or noise. Because the first sound attenuation structure 38 and the second sound attenuation structure 52 are functionally equivalent the following discussion, illustrated primarily by reference to the structure 52, is equally applicable to the structure 38.

The first sound attenuation structure 38 and second sound attenuation structure 52 absorb acoustic energy from the gases in or near the wall elements. Each structure acts as a plurality of resonators by reason of the compartments formed by the axially and circumferentially extending baffles in the cavity. These resonators, in combination with the wall resistivity, diffuse and damp the acoustic energy of the gases. The radial distance between the permeable wall 54 and the impermeable casing 34 is selected to optimize the acoustic damping causing the structure to attenuate the sound at those frequencies of most concern.

Axial pressure gradients and circumferential pressure gradients are created in the working medium flow path as the working medium gases pass rearwardly through the engine. These gradients in pressure result from a variety of reasons and include gradients resulting from parts of the engine which extend into or across the working medium flow path upstream and downstream of the array of rotor blades. As the gases flow by the permeable wall 54, the working medium gases tend to flow through the cavity 62 by flowing from a region of high pressure in the working medium flow path into the cavity behind the wall and, after flowing in the cavity, to flow back at another location into a region of low pressure in the working medium flow path. As will be realized, such flow through the cavity is accompanied by flow losses which decrease the aerodynamic efficiency of the engine.

The plurality of first partitions 64 and the plurality of second partitions 66 block the flow of working medium gases in the cavity 62 behind the permeable wall 54 and decrease the amount of flow which might otherwise occur because of these pressure gradients. As shown in FIG. 3, the partitions cause the flow to follow the lines $F_c$ and $F_a$ causing the flow to follow a torturous path which increases the resistance to flow in a manner analogous to labyrinth seals. The blockage of flow in the cavity decreases the amount of flow through the cavity and the associated aerodynamic penalty. The spacing $L_c$ and $L_a$ between partitions is a function of the magnitude of the pressure gradients causing the flow; larger gradients require a closer spacing of partitions than smaller gradients.

Other advantages are expected to result from the use of the partitions. It was found, for example, that a flow velocity of seventeen feet per second into the cavity changed by more than sixty-percent (60%) the acoustic resistivity of the wall element. Such a change can greatly reduce the amount of noise energy attenuated by the sound absorbing structure. Blocking the flow of the working medium gases in the cavity behind the permeable wall inhibits flow through the wall and thus avoids this significant change in the acoustical resistivity of the sound attenuation structure and avoids a loss of the attenuation of sound at those frequencies of most concern.

In addition, the partitions interrupt the axial and circumferential continuity of the cavity behind the permeable wall. The interruption of axial and circumferential continuity blocks acoustic waves from traveling in the cavity and avoids the creation of a sound field between the permeable wall and the fan case 34. Avoiding the sound field avoids an alteration in the response of the sound absorbing structure that can decrease the amount of attenuation provided by the structure which results from the sound field interfering with the cyclic movement of the working medium gases in and out of the sound attenuation structure through the acoustically resistive wall.

As the rotor blades pass through the working medium gases at high velocities, the blades cause aerodynamic pressure pulses of large magnitude in the vicinity of the blade. These pulses decay with distance away from the rotor. In addition, acoustic waves are transmitted with minimal decay through the working medium gases. These aerodynamic pressure pulses and acoustic waves pass through the permeable wall and strike the casing member which acts as the impervious backing member for the sound absorbing structure. The casing member is a rigid, massive structural member of the engine and is unaffected by the magnitude of the pressure pulses resulting in an improved fatigue life of the sound absorbing structure as compared with those constructions in which the impervious backing member is a less rigid, less massive member such as is found in sound absorbing panels.

The fatigue life of the sound attenuation structure 52 shown in FIG. 3 and FIG. 4 is enhanced by avoiding the transmission of vibrations from the casing element 34 to the wall element 54 through the partitions 64, 66. Each partition is spaced either from the casing or the wall element. Engine vibrations in the case which might result from the rotor blades striking the abradable rubstrip on the engine case are not transmitted through the partitions to the wall element. As will be realized, a small amount of such vibrations are transmitted through the radially extending casing element which spaces the wall element from the casing element to form the cavity 62. In the construction shown in FIG. 5, the end sections 76, 78 of the partitions 64 are not integrally attached to the wall element and the casing element. The end sections abuttingly engage the wall element in the region R and casing element in the region R'. Rubbing contact between the casing element and the partitions and between the partitions and the wall element results in damping of the vibrations in the wall element and in the partitions.

As shown in FIG. 6, a small amount of relative movement occurs between partitions at the point of mechanical attachment providing an amount of vibrational damping but not to the extent of the construction shown in FIG. 5. The end sections 76, 78 provide a wide base for the adhesive as compared with the thickness of the center section 74. As will be realized, the circumferentially extending partitions 66 may also be provided with zee-shaped cross sectional shape. The circumferential or axial width of the center section is, of course, limited by the spacing between the partitions.

Although the invention has been shown and described with respect to detailed embodiments thereof, it should be understood by those skilled in the art that various changes in form and detail thereof may be made without departing from the spirit and the scope of the claimed invention.

We claim:

1. A stator structure for attenuating the noise of an axial flow gas turbine engine which extends circumferentially about an axis of symmetry of the engine and bounds an annular flow path for working medium gases, comprising:
   a casing element for confining the working medium gases to the working medium flow path;
   a permeable wall element which is attached to the casing element and which is spaced radially from the casing element leaving a cavity therebetween bounded by the permeable wall element and by said casing element, the cavity being in fluid communication through the permeable wall element with the working medium flow path; and
   a plurality of partitions extending between the casing element and the wall element, at least one of which interrupts the circumferential continuity of the cavity, each partition being attached to at least one of said elements.

2. The stator structure of claim 1 wherein at least one partition is attached to the wall element and wherein each partition attached to the wall element is spaced radially from the casing element leaving a gap therebetween.

3. The stator structure of claim 2 wherein all partitions are attached to the wall element and are spaced radially from the casing element leaving a gap therebetween.

4. The stator structure of claim 1 wherein at least one partition is attached to the casing element and wherein each partition attached to the casing element is spaced radially from the wall element leaving a gap therebetween.

5. The stator structure of claim 4 wherein all partitions are attached to the casing element and are spaced radially from the wall element leaving a gap therebetween.

6. The stator structure of claim 1 wherein each partition is in abutting contact with the wall element and the casing element.

7. The stator structure of claim 6 wherein each partition has a zee-shaped cross-sectional shape formed of a center section extending in a generally radial direction, a first end section which abuts the casing element and which extends from the center section in a direction substantially perpendicular to the center section and a second end section which extends from the center section in a direction substantially perpendicular to the center section wherein the first end section abuts the casing element and the second end section abuts the wall element to provide rubbing contact between the casing element and the partitions and between the partitions and the wall element which results in damping of vibrations in the wall element and in the partitions.

8. The stator structure of claim 2, 3, 4, 5, 6, or 7 wherein at least one partition extends in a generally circumferential direction and at least one partition extends in a generally axial direction.

9. The stator structure of claim 6 wherein each partition has a zee-shaped cross-sectional shape formed of a center section extending in a generally radial direction, a first end section which abuts the casing element and which extends from the center section in a direction substantially perpendicular to the center section and a second end section which extends from the center section in a direction substantially perpendicular to the center section wherein the first end section is attached to the wall element and the second end section is attached to the casing element.

10. A stator structure for attenuating the noise of an axial flow gas turbine engine which extends circumferentially about an axis of symmetry of the engine and which bounds an annular flow path for working medium gases, comprising:
    a casing element for confining the working medium gases to the working medium flow path;
    a permeable wall element spaced radially from the casing element leaving a cavity therebetween bounded by the casing element and the permeable wall element, the cavity being in fluid communication through the permeable wall element with the working medium flow path;
    a first plurality of partitions extending in a generally axial direction each spaced circumferentially from the adjacent partition, the plurality of partitions being alternately spaced from the casing element leaving a radial gap therebetween and from the wall element leaving a radial gap therebetween;
    a second plurality of partitions extending in a generally circumferential direction each spaced axially from the adjacent partition, the plurality of partitions being alternately spaced from the casing element leaving a radial gap therebetween and spaced from the wall element leaving a radial gap therebetween.

* * * * *